United States Patent
Chang

(10) Patent No.: US 6,865,974 B2
(45) Date of Patent: Mar. 15, 2005

(54) SAWDUST REMOVING DEVICE FOR A BAND SAW MACHINE

(75) Inventor: Barry Chang, Taichung (TW)

(73) Assignee: WMH Tool Group Hong Kong Limited, Taichung (TW)

( * ) Notice: Subject to any disclaimer, the term of this patent is extended or adjusted under 35 U.S.C. 154(b) by 0 days.

(21) Appl. No.: 10/320,427

(22) Filed: Dec. 17, 2002

(65) Prior Publication Data

US 2004/0112193 A1 Jun. 17, 2004

(51) Int. Cl.$^7$ ................................................ B26D 7/18
(52) U.S. Cl. .............................. 83/98; 83/169; 83/788
(58) Field of Search ............................ 83/98, 168, 169, 83/788; 417/362; 418/259

(56) References Cited

U.S. PATENT DOCUMENTS

| | | | | |
|---|---|---|---|---|
| 2,107,174 A | * | 2/1938 | Boice .................... | 83/169 X |
| 2,208,843 A | * | 7/1940 | Hedgpeth ................ | 83/98 X |
| 2,395,237 A | * | 2/1946 | Swenson ................. | 83/98 |
| 4,486,158 A | * | 12/1984 | Maruyama et al. ....... | 418/259 X |
| 4,898,526 A | * | 2/1990 | Sakamaki et al. ....... | 418/259 X |
| 6,491,505 B1 | * | 12/2002 | Hueser et al. .......... | 417/410.3 |

* cited by examiner

Primary Examiner—Clark F. Dexter
(74) Attorney, Agent, or Firm—Troxell Law Office, PLLC

(57) ABSTRACT

A sawdust-removing device for a band saw machine with a power outlet device is fitted around the shaft of a motor of a band saw machine. The motor can also supply the sawdust-removing device with power at the same time to carry out clearing off sawdust. The sawdust-removing device includes a housing, a rotor and a plurality of blades. The housing has an air chamber for the rotor with the blades to be eccentrically positioned therein. The rotor is rotated by the shaft of the motor to suck in and exhaust out air for blowing off sawdust on planks being sawed. The device is easy to be integrally assembled, takes little space inside the band saw machine and is able to reduce cost in equipment and maintenance.

5 Claims, 5 Drawing Sheets

SAWDUST REMOVING DEVICE FOR A BAND SAW MACHINE

BACKGROUND OF THE INVENTION

This invention relates to a sawdust removing device for a band saw machine, particularly to one mounted coaxially on the shaft of a motor which rotates to supply the bandsaw machine and the sawdust removing device with power at the same time to carry out sawing and clear off sawdust respectively, able to elevate quality of plank sawing and lower cost in equipment and maintenance.

The motor of a conventional band saw machine is provided to drive a band saw to rotate and carry out sawing of a plank. However, in the process of plank sawing, there will certainly produce a great amount of sawdust at the location where the plank is being sawed and the sawdust may disperse on the plank being sawed and cover up a sawing reference line marked thereon in advance, rendering the plank unable to be sawed precisely.

SUMMARY OF THE INVENTION

One objective of the invention is to offer a sawdust removing device for a band saw machine having a power output device, combined coaxially around the shaft of a motor which supplies the band saw machine and the sawdust removing device with power respectively for sawing and clearing off sawdust simultaneously, able to be integrally assembled easily and needless to take much space inside the band saw machine.

Another objective of the invention is to offer a sawdust removing device for a band saw machine, in which a motor supplies the band saw machine and the sawdust removing device with power for sawing and removing sawdust at the same time, able to reduce cost in operating processes and maintenance.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
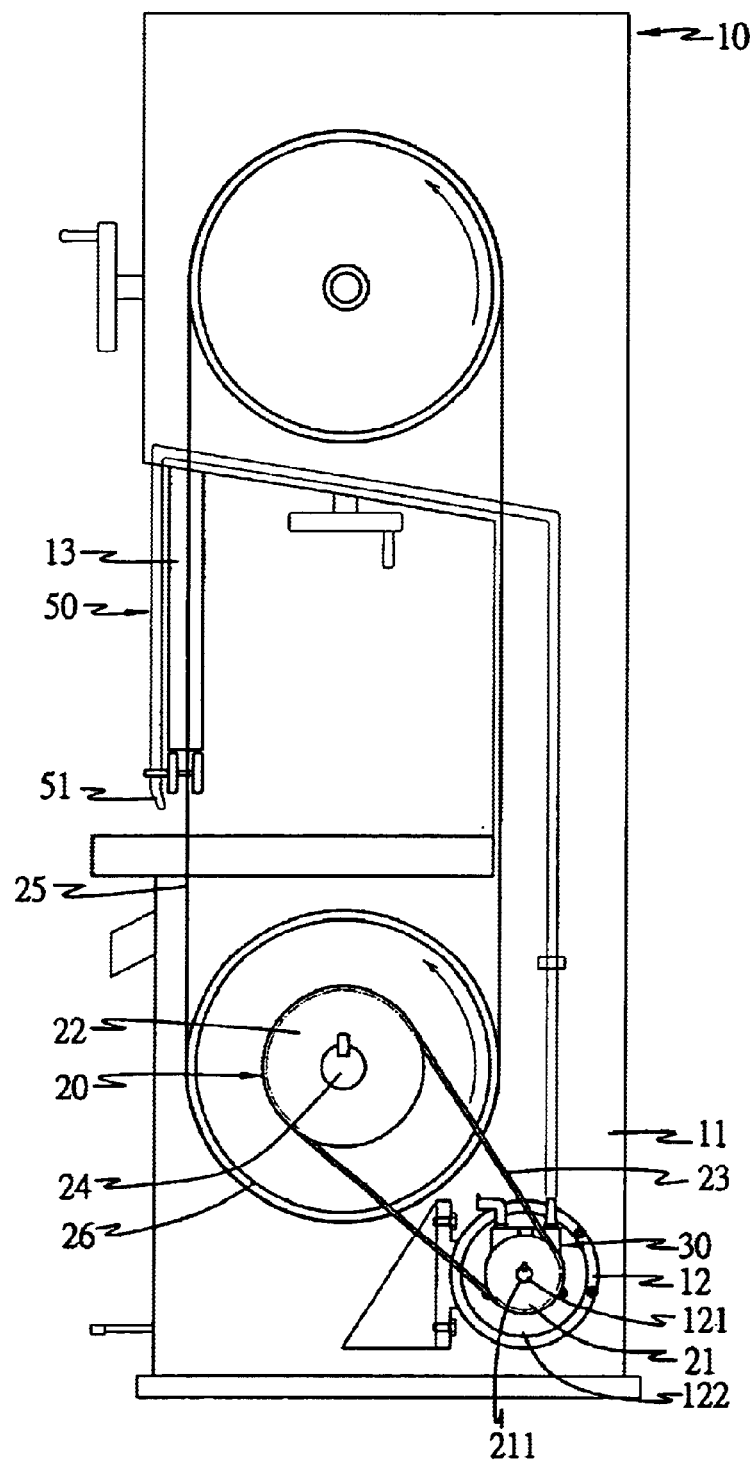
FIG. 1 is a front view of a band saw machine provided with a sawdust-removing device in the present invention.

A preferred embodiment of a sawdust-removing device for a band saw machine in the present invention, as shown in FIG. 1, is combined with a band saw machine 10, which also has a power output device.

The band saw machine 10 has a machine base 11 installed inside with a motor 12 having its shaft 121 mounted thereon with the power output device 20 and the sawdust removing device 30. The motor 12 is formed with a level-combining surface 122 on the same side of the shaft 121.

The power output device 20 consists of an actuating wheel 21, a subordinate wheel 22 and a transmitting belt 23. The actuating wheel 21 is bored with a shaft hole 211 in the center for the shaft 121 of the motor 12 to be fitted therein. The subordinate wheel 22 is secured on one end of a transmitting shaft rod 24, which has the other end assembled with a driving disk 26 able to drive a band saw 25 to rotate. The transmitting belt 23 connects the actuating wheel 21 and the subordinate wheel 22 to transmit power for the band saw 25 to rotate and carry out sawing when the shaft 121 of the motor rotates.

Figure 2:
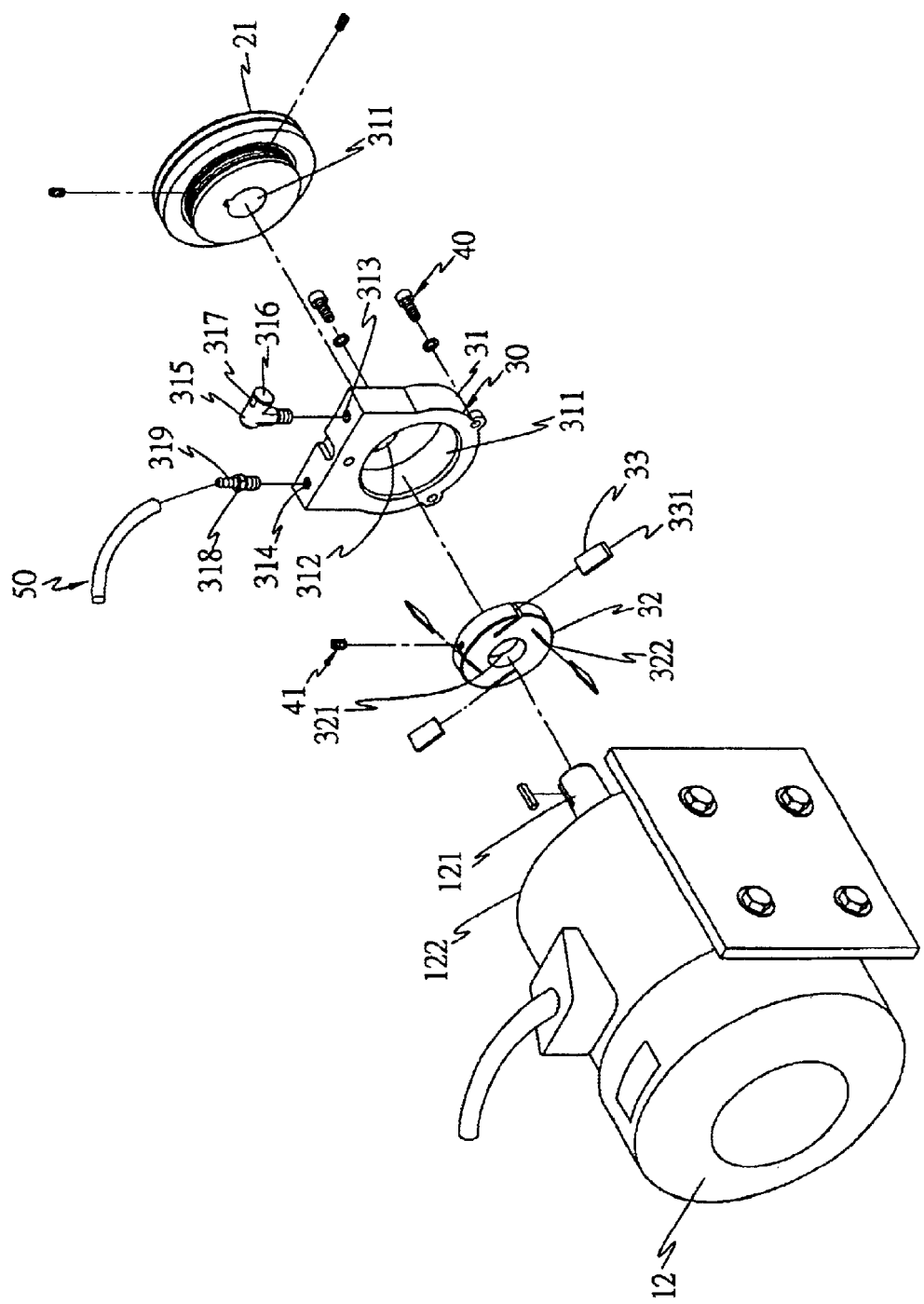
FIG 2 is an exploded perspective view of the sawdust-removing device for a band saw machine in the present invention.
Figure 3:
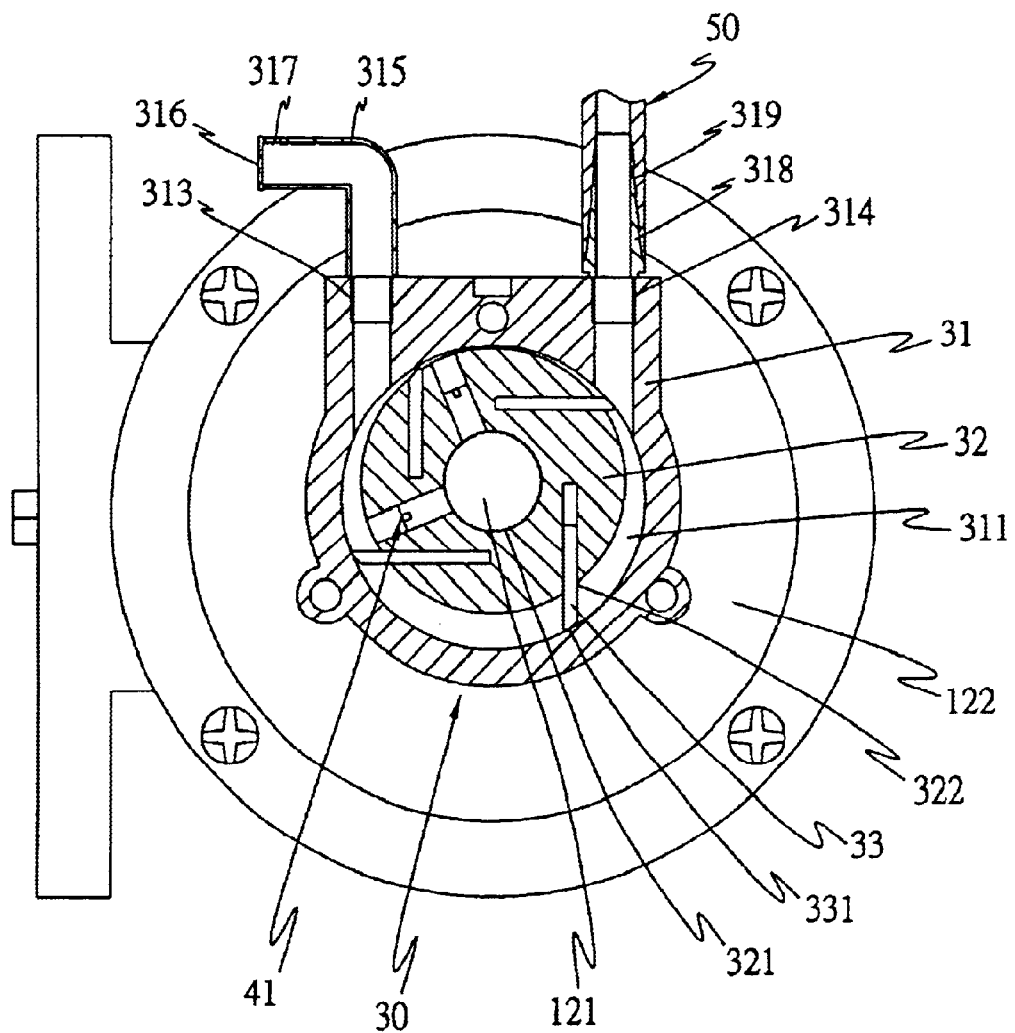
FIG. 3 is a side cross-sectional view of the sawdust-removing device for a band saw machine in the present invention.

The sawdust-removing device 30, as shown in FIGS. 2 and 3, includes a housing 31, a rotor 32 and four blades 33.

The housing 31 to be assembled on the combining surface 122 of the motor 12 by bolts 40 is formed in the central interior with a round air chamber 311 facing the combining surface 122 of the motor 12. The air chamber 311 is bored with shaft hole 312 at a preset eccentric location at the bottom for the shaft 121 of the motor 12 to be pivotally inserted therethrough. Further, the housing 31 has an air inlet 313 and an air outlet 314 respectively provided at a corresponding position on top and communicating with the air chamber 311. The air inlet 313 is threadably engaged with an L-shaped valve member 315 having a valve lid 316 pivotally positioned on a sidewise opening, and an air intake hole 317 bored in an upper edge near the valve lid 316. The air outlet 314 is also threadably engaged with an adapter 318 having a stepped connecting member 319 formed at the upper portion and gradually tapering from the bottom top for connecting with one end of a hollow plastic guide pipe 50, which has the other end fitted with a nozzle 51 fixed on the guide base 13 of the band saw machine 10. The guide base 13 is adjustable to move up and down so as to guide and adjust the band saw 25 to rotate.

The rotor 32 is a disk-shaped body having a fitting hole 321 in the center for the shaft 121 of the motor 12 to be inserted therethrough and fixed therein by two bolts 41 screwing through an upper edge of the rotor 32 to let the rotor 12 rotate together with the shaft 121. Since the shaft 121 of the motor 12 is eccentrically assembled with the housing 31, the rotor 32 is positioned eccentrically in the air chamber 311 of the housing 31. Besides, the rotor 32 is bored with four slide notches 322 spaced apart equidistantly at quartering positions respectively around the circumferential edge.

The four blades 33 are plate bodies respectively and slidably fitted in the four slide notches 322 of the rotor 32 to move back and fourth therein when the rotor 32 rotate. In addition, each blade 33 has its outer end formed with a curved surface 331 for contacting closely with the inner wall of the air chamber 311 of the housing 31.

Figure 4:
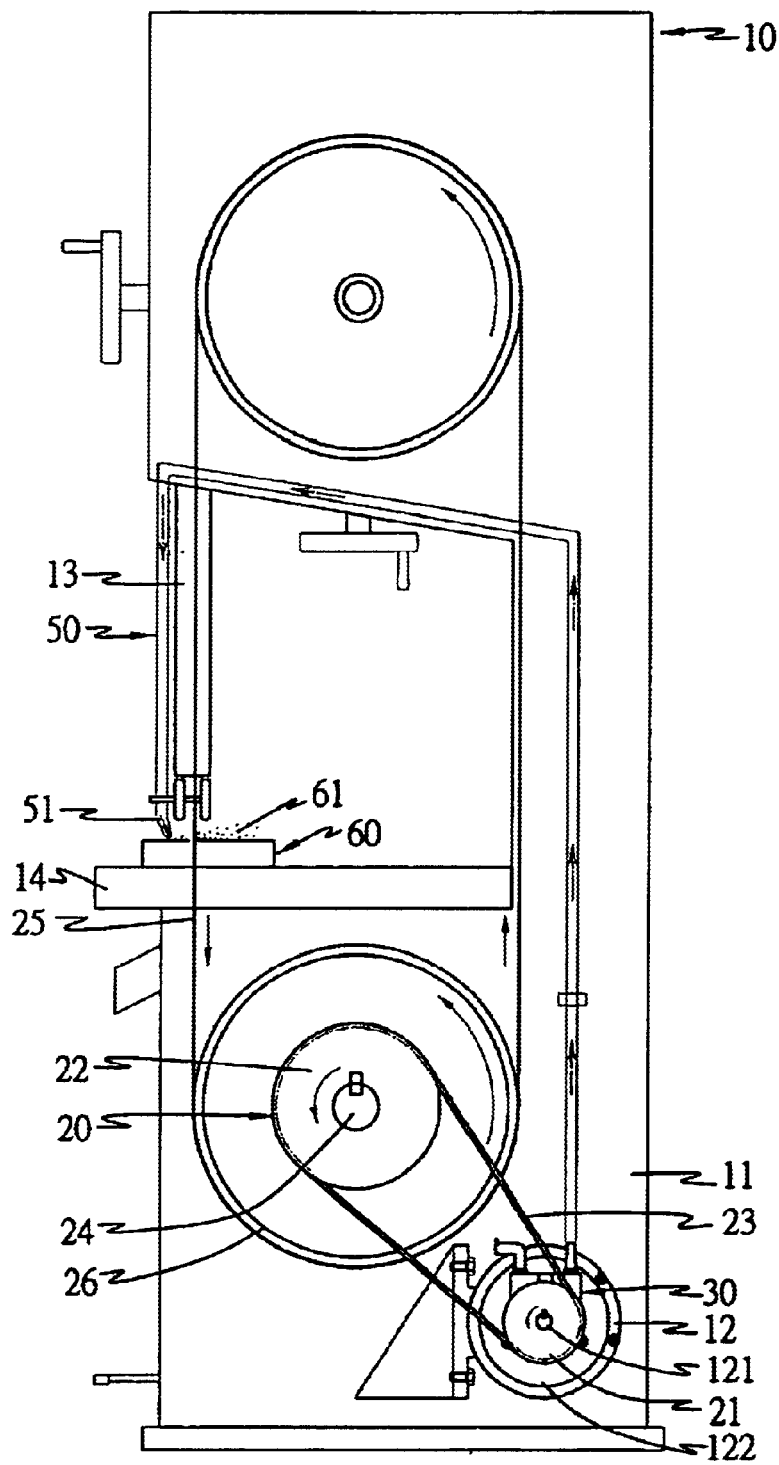
FIG. 4 is a front view of the band saw machine provided with the sawdust removing device in an operating condition in the present invention.
Figure 5:
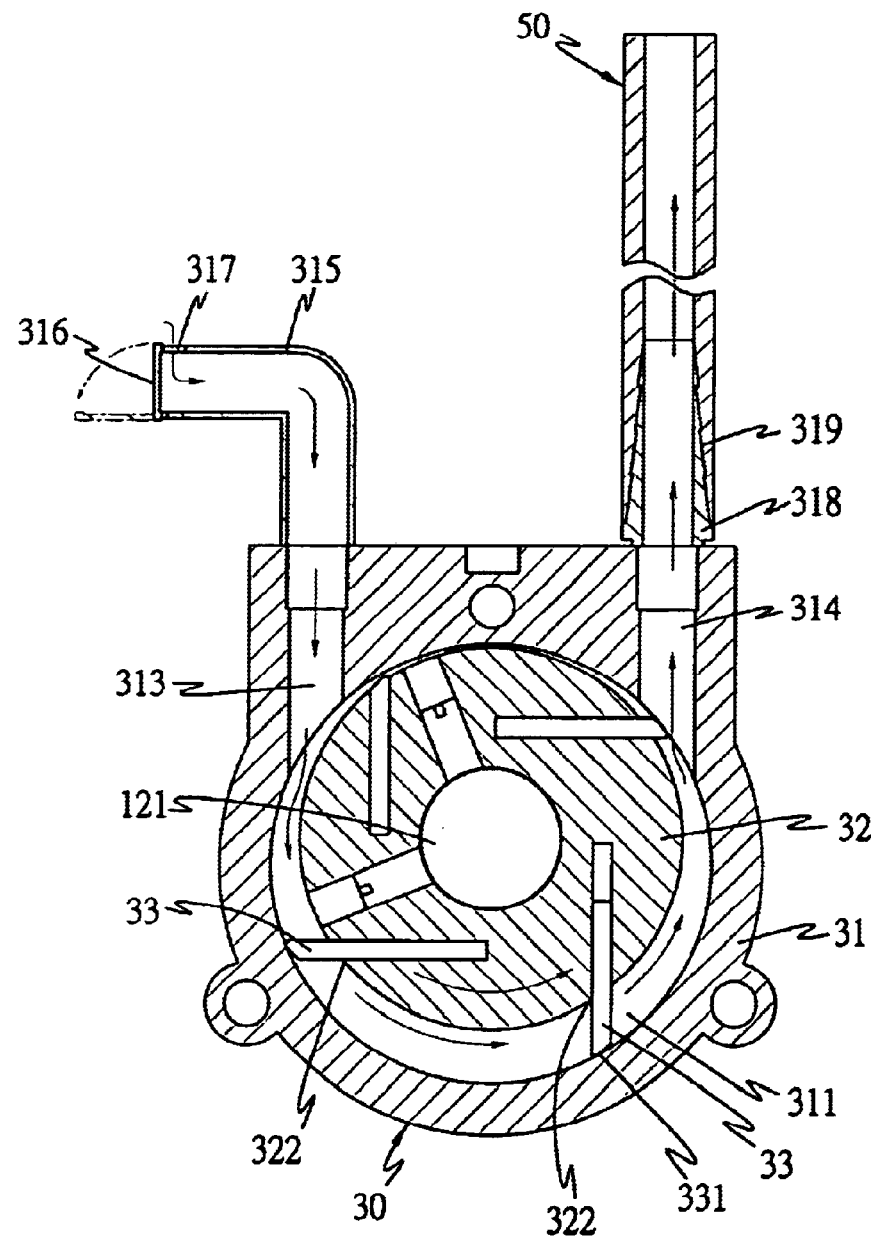
FIG. 5 is a side cross-sectional view of the sawdust-removing device for a band saw machine in an operating condition in the present invention.

In operating, as shown in FIGS. 4 and 5, a plank 60 is flatly placed on the workbench of the band saw machine 10 and the guide base 13 is moved downward close to the plank 60 to be sawed. Then, the motor 12 is started to let its shaft 121 rotate to move synchronously the power output device 20 and the band saw 25 to carry out sawing. Synchronously, the rotor 32 of the sawdust removing device 30 is actuated to rotate together with the four blades 33, which will then slide back and forth in the slide notches 322 due to an eccentric force produced by the rotating rotor 32 and their eccentric positions in the air chamber 311. Simultaneously, the curved surfaces 331 of the blades 33 will respectively contact with the inner wall of the air chamber 311 alternately to suck in and exhaust out air by means of the four blades 33 moving back and forth in the air chamber 311.

Thus, air is sucked into the air chamber 311 through the air intake hole 317 and the air inlet 313, and then compressed by the blades 33 and led into the guide pipe 50 through the air outlet 314. Subsequently, the air in the guide pipe 50 is led to the nozzle 51 and sprayed on the plank 60 being sawed to clear off the sawdust 61 produced in the process of sawing, preventing a sawing reference line marked on the plank 60 from being covered by sawdust and enabling an operator to carry out plank sawing with precision.

In addition, the valve lid 316 of the valve body 315 is openable, therefore a proper amount of lubricant can be injected into the air chamber 311 through the opening of the valve body 315 to have the interior of the air chamber 311 properly lubricated so as to let the curved surfaces 331 of the blades 33 contact with the inner wall of the air chamber 311 with great smoothness.

As can be noted from the above description, this invention has the following advantages.

1. The sawdust removing device 30 and the power output device 20 are coaxially mounted on the shaft 121 of the motor 12 directly, so the motor 12 can supply the bandsaw machine 10 and the sawdust removing device 30 with power, respectively to carry out sawing and clear off sawdust at the same time, and it is needless to have a small motor additionally provided for the sawdust removing device 30 and it facilitates a lower cost in equipment and maintenance.

2. The sawdust removing device 30 has its housing 31 fixedly combined on the combining surface 122 of the motor 12 and its rotor 32 secured on the shaft 121 for rotating together, hardly tasking any space inside the band saw machine 10, able to be assembled quickly and easily, applicable to any band saw machine of different specifications and able to elevate economic gain.

While the preferred embodiment of the invention has been described above, it will be recognized and understood that various modifications may be made therein and the appended claims are intended to cover all such modifications that may fall within the spirit and scope of the invention.

I claim:

1. A sawdust removing device for a band saw machine combined with a bandsaw machine, which has a machine base provided inside with a motor, said motor having its shaft fitted thereon with an actuating wheel of a power output device, a transmitting belt connecting said actuating wheel and a subordinate wheel, said subordinate wheel transmitting power of said motor to a band saw of said band saw machine for rotating and carrying out sawing, said sawdust removing device mounted on said shaft of said motor, said motor formed with a combining surface on the same side of said shaft; and, said sawdust removing device comprising a housing, a rotor and plural blades preset in number, said housing firmly fixed on said combining surface of said motor, said housing formed in the center with a round air chamber facing said combining surface of said motor, a shaft hole axially provided at an eccentric location of said air chamber, said shaft hole pivotally fitted with said shaft of said motor, said housing having an air inlet and an air outlet respectively bored at a predetermined location on top thereof and communicating with said air chamber, said air inlet threadably engaged with a valve body, said air outlet threadably engaged with an adapter connected with a guide pipe, said rotor bored with a fitting hole in the center for said shaft of said motor and said shaft being inserted therethrough, said rotor eccentrically received in said air chamber and able to rotate together with said shaft of said motor, said rotor provided with slide notches preset in number, said slide notches positioned spaced apart equidistantly around a circumference edge of said rotor, said blades respectively fitted in said slide notches to move back and forth therein, said blades having their outer ends alternately contacting with the inner wall of said air chamber when said rotor rotates, said blades rotating together with said rotor and moving back and forth to suck in and exhaust out air repeatedly, air sucked in said air chamber and led into said guide pipe, which has the other end positioned above a workbench of said band saw machine.

2. The sawdust removing device for a band saw machine as claimed in claim 1, wherein said valve body is L-shaped, having a valve lid pivotally provided on a sidewise opening, and an air intake hole located at predetermined distance from said valve lid.

3. The sawdust removing device for a band saw machine as claimed in claim 1, wherein said adapter has its upper side formed with a stepped connecting member gradually tapering from a bottom to a top.

4. The sawdust removing device for a band saw machine as claimed in claim 1, wherein said guide pipe is a hollow plastic pipe having one end fitted with said adapter and the other end connected with a nozzle fixed on a guide base of said band saw machine, and said guide base is adjustable to move up and down for guiding and adjusting said band saw to rotate and carry out sawing.

5. The sawdust removing device for a band saw machine as claimed in claim 1, wherein each said blade has its outer end formed with a curved surface for closely with the inner wall of said air chamber.

* * * * *